United States Patent
Le Rouzic et al.

(10) Patent No.: US 10,447,650 B2
(45) Date of Patent: Oct. 15, 2019

(54) METHOD OF DYNAMIC UPDATING OF INFORMATION OBTAINED FROM A DNS SERVER

(71) Applicant: Orange, Paris (FR)

(72) Inventors: Jean-Claude Le Rouzic, Trebeurden (FR); Jose Doree, Lannion (FR)

(73) Assignee: ORANGE, Paris (FR)

( * ) Notice: Subject to any disclaimer, the term of this patent is extended or adjusted under 35 U.S.C. 154(b) by 290 days.

(21) Appl. No.: 15/106,695

(22) PCT Filed: Dec. 17, 2014

(86) PCT No.: PCT/FR2014/053393
§ 371 (c)(1),
(2) Date: Jun. 20, 2016

(87) PCT Pub. No.: WO2015/092278
PCT Pub. Date: Jun. 25, 2015

(65) Prior Publication Data
US 2016/0337311 A1    Nov. 17, 2016

(30) Foreign Application Priority Data
Dec. 20, 2013 (FR) ..................................... 13 63203

(51) Int. Cl.
*H04L 29/12* (2006.01)
*H04L 29/06* (2006.01)
(Continued)

(52) U.S. Cl.
CPC .......... *H04L 61/1511* (2013.01); *H04L 41/12* (2013.01); *H04L 51/24* (2013.01);
(Continued)

(58) Field of Classification Search
None
See application file for complete search history.

(56) References Cited

U.S. PATENT DOCUMENTS

| 7,680,956 B2* | 3/2010 | Volz | H04L 29/12066 370/219 |
| 7,904,898 B2* | 3/2011 | King | H04L 29/12009 717/121 |

(Continued)

OTHER PUBLICATIONS

English Translation of the Written Opinion dated Mar. 20, 2015 for International Application No. PCT/FR2014/053393, filed Dec. 17, 2014.

(Continued)

*Primary Examiner* — Joshua Joo
(74) *Attorney, Agent, or Firm* — David D. Brush; Westman, Champlin & Koehler, P.A.

(57) ABSTRACT

A method of dynamically updating DNS information in an IP network. A first entity of the IP network, distinct from DNS servers of the IP network, receives a request from a second entity of the network, likewise distinct from the DNS servers but possessing a copy of DNS information, constituting a record in at least one DNS server of the IP network. The first entity responds to the request by sending a message to the second entity, including an indication about the need to modify the copy. On receiving the message, the second entity determines whether the indication includes at least one additional instruction. If so, the second entity: performs a DNS interrogation, and on receiving a response, modifies its copy of the DNS information based the response and the additional instruction; or modifies its copy of the DNS information based on the additional instruction without performing a DNS interrogation.

13 Claims, 2 Drawing Sheets

(51) Int. Cl.
*H04L 12/24* (2006.01)
*H04L 12/58* (2006.01)
*H04L 29/08* (2006.01)

(52) U.S. Cl.
CPC ...... *H04L 61/2007* (2013.01); *H04L 61/2076* (2013.01); *H04L 65/1006* (2013.01); *H04L 65/1016* (2013.01); *H04L 65/1073* (2013.01); *H04L 67/1095* (2013.01)

(56) References Cited

U.S. PATENT DOCUMENTS

| | | | |
|---|---|---|---|
| 8,522,086 B1 | 8/2013 | Garrett | |
| 9,444,916 B2* | 9/2016 | Backholm | H04L 61/1511 |
| 9,887,958 B2* | 2/2018 | White | H04L 67/1008 |
| 2005/0125545 A1* | 6/2005 | Cheshire | H04L 29/06 709/227 |
| 2010/0312875 A1* | 12/2010 | Wilerson | H04L 29/12066 709/224 |
| 2011/0082920 A1* | 4/2011 | Bhattacharya | G06F 9/5072 709/221 |
| 2011/0096788 A1* | 4/2011 | Ballard | H04L 29/12066 370/401 |
| 2012/0179801 A1 | 7/2012 | Luna et al. | |
| 2012/0278626 A1* | 11/2012 | Smith | H04L 61/1511 713/176 |
| 2012/0297197 A1* | 11/2012 | Yale | H04L 67/34 713/179 |
| 2012/0297478 A1* | 11/2012 | Martin | H04L 29/12066 726/22 |
| 2013/0067104 A1* | 3/2013 | Zhang | H04N 21/2543 709/228 |
| 2018/0041466 A9* | 2/2018 | Kagan | H04L 47/24 |

OTHER PUBLICATIONS

International Search Report dated Mar. 20, 2015 for corresponding International Application No. PCT/FR2014/053393, filed Dec. 17, 2014.
Written Opinion dated Mar. 20, 2015 for corresponding International Application No. PCT/FR2014/053393, filed Dec. 17, 2014.
J. Rosenberg et al., "SIP: Session Initiation Protocol" RFC 3261, Jun. 2002.
A. B. Roach, "Session Initiation Protocol (SIP)—Specific Event Notification" RFC 3265, Jun. 2002.
M. Mealling, "Dynamic Delegation Discovery System (DDDS) Part Three: The Domain Name System (DNS) Database", RFC 3403, Oct. 2002.
P. Faltstrom et al., "The E.164 to Uniform Resource Identifiers (URI) Dynamic Delegation Discovery System (DDDS) Application (ENUM)" RFC 3761, Apr. 2004.
R. Mahy, "A Message Summary and Message Waiting Indication Event Package for the Session Initiation Protocol (SIP)" RFC 3842, Aug. 2004.
H. Schulzrinne, "The tel URI for Telephone Numbers" RFC 3966, Dec. 2004.
T. Berners-Lee et al., "Uniform Resource Identifier (URI): Generic Syntax" RFC 3986, Jan. 2005.

* cited by examiner

METHOD OF DYNAMIC UPDATING OF INFORMATION OBTAINED FROM A DNS SERVER

CROSS-REFERENCE TO RELATED APPLICATIONS

This Application is a Section 371 National Stage Application of International Application No. PCT/FR2014/053393, filed Dec. 17, 2014, the content of which is incorporated herein by reference in its entirety, and published as WO 2015/092278 on Jun. 25, 2015, not in English.

FIELD OF THE DISCLOSURE

The present invention relates to Internet protocol (IP) type communications networks, and in particular those IP networks that are suitable for performing advanced session control protocols. IP networks enable conversational data to be broadcast in the context of services such as "voice over IP" (VoIP), "content sharing", or "instant messaging".

More particularly, the present invention relates to means put into place in an IP network to enable entities of the network, such as core network servers or user equipment (UE), to update dynamically information that those entities obtain from a domain name system (DNS) server.

BACKGROUND OF THE DISCLOSURE

By way of example, user equipment may comprise a fixed or mobile terminal, a residential or business gateway, or indeed a voice gateway such as a SIP-DSLAM (digital subscriber line access multiplexer), i.e. a device that collects digital subscriber line (DSL) data traffic passing over a certain number of telephone lines.

It is said that user equipment "belongs" to the network of a given operator when the user of the equipment possesses an account with that operator, and this applies regardless of the access network used by the user equipment to connect with the operator's network.

Examples of core network servers suitable for performing the present invention are given below.

IP network communications services can identify physical or virtual resources by means of character strings such as a uniform resource identifier (URI). The syntax for URIs is defined in the Internet Engineering Task Force (IETF) document RFC 3986; knowing the URI of a resource makes it possible to obtain the IP address of equipment in the operator's network that manages the resource. In the present description, the term "URI" is used to cover any type of identifier for a physical or virtual application resource that is accessible on the network.

Conventional advanced session protocols, such as the session initiation protocol (SIP) use so-called "signaling" messages, which are messages that enable a terminal to request a connection with another terminal, and also messages that indicate that a telephone line is busy, or that a called telephone is ringing, or that the telephone is connected to the network and can be reached in such-and-such a manner.

The SIP protocol was defined by the IETF in document RFC 3261. That protocol enables multimedia sessions to be set up, modified, and terminated in a network using the IP protocol. The SIP protocol has since been extended, in particular in document RFC 3265. This extension provides for event notification procedures.

In networks that use the SIP protocol, a distinction is drawn between two types of resource identifier: those having the form "SIP-URI", as defined in RFC 3261, and those having the form "tel-URI", as defined in RFC 3966. An SIP-URI has the form "sip:user@host" (e.g. sip: alice@domain1), where the "host" portion identifies the domain of the operator responsible for the identity represented by the "user" portion. A tel-URI has the form "tel:telephone_number" (e.g. tel:+33123456789) with reference to international public telephone numbers, or of the form "tel:telephone_number;phone-context= . . . " (e.g. tel:0623456789;phone-context=+33) with reference to telephone numbers of a format that is valid only in a narrower context (in this example, the ten digit format 0623456789 is valid only within the French numbering plan).

The SIP protocol is used in particular in infrastructures of the IP multimedia subsystem (IMS) type. The IMS was defined by the Third Generation Partnerships Project (3GPP) standards organization and by telecommunications and Internet Converged Services and Protocols for Advanced Networking (TISPAN). It is a network architecture that was introduced by the 3GPP for mobile networks and then taken on by TISPAN for fixed networks. This architecture enables multimedia sessions to be set up dynamically and controlled between two clients and also enables resources to be reserved in the multimedia stream transport network. By means of this architecture, network operators can implement a management policy conveniently, can supply a predetermined quality of service (QoS), and can calculate how much to bill their clients. At present, the IMS makes it possible to access services of the telephone, videos phone, presence, and instant messaging types, and it also manages interactions between them.

When a user seeks to benefit from services made available by an IMS network, the user sends signaling messages to the network that may include in particular various types of request.

Firstly, user equipment needs to register with the network (with some exceptions such as certain emergency calls). When the network is incapable of establishing the link between the registration and an earlier registration (e.g. following a network failure, or after the terminal has been switched off for a period longer than a predetermined value), the registration is considered as being an initial registration. After an initial registration, the equipment must periodically send a request to the network in order to confirm that it seeks to maintain its registration; the registration is maintained only for a predetermined duration, referred to herein as the "registration refresh period" (and often specified in technical literature by the term "expires"); by way of example, abovementioned document RFC 3261 recommends a registration refresh period of 3600 seconds. In practice, it is the network that informs each user equipment that registers of the value of the registration refresh period with which the equipment is to comply in order to benefit without interruption from the services made available by the network.

Thus, in order to be able to register user equipments, IMS networks have one or more registration servers referred to as serving-call server control function (S-CSCF) servers that are suitable (amongst other things) for managing the procedure of registering devices connected to the network.

In addition, networks have one or more servers known as interrogating-call server control function (I-CSCF) servers—which are often physically combined with S-CSCF type servers so as to constitute so-called "I/S-CSCF" servers—that, at the time of registering a user equipment interrogates a home subscriber server (HSS) in order to be able to select an S-CSCF server that possesses the characteristics that are necessarily required (and also, where appropriate, optionally required) for reaching the level of service to which the user has subscribed. Each HSS server contains a client database and is thus the equivalent in IP networks of the home location register (HLR) servers that are used in networks of the global system for mobile communication (GSM). Each HSS server contains the "profile" of a certain number of user equipments of the network, which profiles comprise their registration states, authentication and location data, and the services to which they have subscribed.

Each user can send a request to subscribe to certain services that are valid for the current connection to an S-CSCF server that has thus been allocated to the user. The general principle is that user equipment can subscribe to a particular technical service by means of an appropriate request (SIP SUBSCRIBE). Thus, when subscribing to the state of a resource, event notifications (SIP NOTIFY) are sent to the user equipment as soon as the state of the resource changes; for example, when the user of a terminal has a voice mailbox on the network, the terminal can subscribe to being notified when a message is left, i.e. it can request to be informed each time a message is recorded in the voice mailbox; likewise, a user equipment can request to be notified about its own registration state, and so on.

Initial subscription requests are sent either automatically immediately after the terminal starts or after an application that is installed on the terminal starts, or else as a result of a user action on the interface of the terminal. For each subscription, the user equipment must begin by sending an initial request, and must then periodically send a request to renew the subscription (the subscription is said to be "refreshed").

For each subscription (whether an initial subscription or a refreshed subscription), the network informs the user equipment of the refresh period desired by the network operator for that subscription. In document RFC 3265, the maximum refresh period associated with the subscription to a particular technical service, or "event-package", made available by the network is defined by reference to the document that defines the particular technical service; for example, concerning a subscription to being notified that a message has been left, document RFC 3842 recommends a refresh period lying in the range a few hours to a few days (cf. "event-package message summary").

It should also be recalled that the DNS system is a service making it possible to find information on the basis of a domain name. DNS servers interact with any "DNS resolver" network entity that has sent a DNS request to make available associations between a domain name and information of a certain type, referred to as "resource records". In particular, naming authority pointer resource records (NAPTRs), as described in RFC 3403, specify substitution rules to be applied to a character string in order to produce a certain result, such as in particular another domain name or a URI. By means of NAPTR records, the DNS system thus makes it possible to make one character string correspond to another character string by making a domain name search. The term "DNS configuration" is used to designate the data recorded at a given moment in a given DNS server.

In the context of the present invention, the term "DNS information" designates any information of a type that might be recorded in at least one DNS server of an IP network.

In order to be able to set up a call via one or more networks, the network/domain to which the caller belongs, referred to below as the "origin domain", thus needs to know the identity of the network/domain that makes it possible to reach the called user (referred to below as the "destination domain"). However, the caller often knows only the telephone number of the called user, which telephone number is in the public format in compliance with recommendation E.164 or in a private format. In this respect, it should be recalled that the format for public telephone numbers on the international scale is defined by ITU-T recommendation E.164, where the ITU-T is a part of the International Telecommunication Union (ITU) responsible for devising international standards.

Unfortunately, the telephone number does not make it easy to determine the identity of the destination domain; in other words, there is no automatic association between the E.164 identifier and the URI (or URIs) for entering the destination domain. In this respect, it should be observed that a domain may possess a plurality of entry URIs, which may possibly vary as a function of the identity of the calling domain; for brevity in the present document, the term "URI of the destination domain" is used occasionally to cover the entry URI or the entry URIs of that domain.

In order to solve this problem, the origin domain may for example make use of an enumeration (ENUM) application. The ENUM application uses a database belonging to the network to which the origin domain belongs and containing particular NAPTR records defined in RFC 3761. By making a DNS request using an interrogation key (as described below) representative of a telephone number in the E.164 format, the ENUM application makes it possible to discover the URIs that can be used for reaching a correspondent. These URIs point to resources or services associated with the E.164 number of the correspondent, such as for example an email address, a web page, a directory service, fixed or mobile forwarding numbers, or an alias for voice over IP, for videophone, or for instant messaging.

A certain time to live (TTL) is associated with the DNS information supplied by the DNS server to the DNS resolver so that the DNS resolver does not perform a new DNS interrogation each time a request is sent to a given destination. It is said that the DNS resolver "caches" the information for a certain duration. All information that is cached in this way is referred to in the context of the present invention as a "copy of DNS information".

The DNS system thus enables requests to be routed very effectively. In particular, if a remote IP address becomes unavailable, it is possible for the DNS resolver to make use of other DNS records relating to resolving a given domain name in order to find another IP address to which to send the request, this other IP address having priority that is lower than the IP address that has become unavailable.

Nevertheless, this DNS translation system suffers from a major problem: it is not possible to request a network entity to update its DNS information. This is very constraining for the operator, since it requires the operator to have short TTLs for records so that the nodes of the network can respond in reasonable time to any change to the topology of the network. Nevertheless, such reduction of the TTL has potentially very great impacts in terms of traffic load, particularly for a DNS server used by subscriber terminals.

It is thus observed that in order to reduce traffic load, certain pieces of equipment in the network such as terminals or residential gateways perform a DNS interrogation only on initialization, and thus retain the information received from the DNS server until the next restart, without taking account of the value of the TTL. For such pieces of equipment, any changes that take place in a DNS record are therefore not taken into account until the next restart.

Likewise, if it is necessary to reorganize the network, the operator is compelled to plan DNS changes far enough in advance to be sure that all of the network nodes will see the TTLs of old DNS information expire. Consequently, in the prior art, it is practically impossible to manage reorganization of a network in order to cope with a temporary overload situation.

SUMMARY

The present invention thus provides a method of dynamically updating DNS information in an IP network, the method comprising the following steps:
 a first entity of said IP network, distinct from the DNS servers of the IP network, receives a request from a second entity of the network, likewise distinct from the DNS servers of the IP network but possessing a copy of information, referred to as "DNS information", of a type constituting a record in at least one DNS server of the IP network;
 said first entity responds to said request by sending a message to said second entity, the message including an indication about the need to modify said copy;
 on receiving said message sent by the first entity, the second entity reads the message in order to determine whether said indication includes at least one additional instruction; and
 if so, the second entity:
  performs a DNS interrogation, and on receiving the response from the interrogated DNS server, modifies its copy of said DNS information on the basis of the content of said response and of said additional instruction; or
  modifies its copy of said DNS information on the basis of said additional instruction without performing a DNS interrogation.

By way of example, said first entity may be a core network server and said second entity may be user equipment such as a user terminal, or some other core network server.

By means of these provisions, an IP network entity (said second entity) may be required to perform, or to reperform, or to avoid performing, a DNS interrogation while still making sure that any modifications to the DNS configuration are taken into account by the network nodes concerned very quickly (i.e. immediately or as soon as possible, given the protocol procedures to be complied with).

The invention thus provides novel possibilities for managing IMS failures and restoration procedures, for re-routing traffic in real time, and also increased flexibility in terms of reorganizing a network, e.g. as a result of the capacity of the network increasing. The invention is also very useful in the context of so-called "cloud" services made available by an IMS network, i.e. self-service on-demand access via the network to configurable shared computer resources, since the invention improves the consistency of DNS information used by the various IMS "functions" described briefly above.

In addition, by including at least one additional instruction in the message sent by the first entity, the first entity can conveniently specify the type of processing expected on the part of said second entity concerning its copy of the DNS information. The first entity may also specify, in a time to live parameter (ttl), the duration for which said processing is to apply.

Furthermore, according to particular characteristics, said indication contained in the message sent by the first entity includes a waiting duration to be observed by the second entity before performing a DNS interrogation.

By means of these provisions, certain non-urgent procedures provided for in standards, such as for example re-registering a terminal or subscribing to certain events, can be performed after a deferred DNS interrogation.

In contrast, in the absence of any additional instruction of the invention in the message sent by the first entity, the second entity:
 performs a DNS interrogation; and
 on receiving the response from the interrogated DNS server, updates its copy of said DNS information on the basis of the content of said response.

By means of these provisions, it is possible to trigger immediate updating of said copy of DNS information in the second entity.

According to other particular characteristics, said first entity observes the need to modify said copy of DNS information on said first entity receiving a notification message sent by a supervision agent for notifying certain changes of configuration of a DNS server to the entities of the IP network that have subscribed to this type of notification.

By means of these provisions, the user equipments connected to the network can be informed in good time of modifications that have occurred in the configuration of a DNS server, but without it being necessary for them to subscribe to notifications of DNS configuration changes with said supervision agent (which would represent excessive loading for the network resulting from the very numerous subscription and notification dialogs that would then need to take place).

Correspondingly, the invention also provides various devices.

Thus, firstly, it provides a device of an IP network, referred to as a "first" entity and distinct from the DNS servers of said IP network, and possessing means for:
 observing a need for a second entity of the network to modify its copy of information, referred to as "DNS information", of a type constituting a record in at least one DNS server of the IP network; and
 sending a message to said second entity of the network, the message including an indication about said need.
Said first entity is remarkable in that it also possesses means for subscribing with a dedicated supervision agent to notification of certain configuration changes of a DNS server, and in that said means for observing a need to modify said copy of DNS information comprise means for receiving a notification message sent by said supervision agent.

The invention also provides, secondly, a device of an IP network distinct from the DNS servers of said IP network and referred to as a "second" entity. Said second entity is remarkable in that it possesses means for:
 receiving from a first entity that is distinct from the DNS servers of the IP network, a message including an indication about the need to modify its copy of information, referred to as "DNS information", of a type constituting a record in at least one DNS server of the IP network;
 reading said message to determine whether said indication includes at least one additional instruction; and
 if so:
  performing a DNS interrogation, and on receiving the response from the interrogated DNS server, modifying its copy of said DNS information on the basis of the content of said response and of said additional instruction; or modifying its copy of said DNS information on the basis of said additional instruction without performing a DNS interrogation.

According to particular characteristics, said second entity further possesses means for performing a DNS interrogation after waiting for a duration mentioned in said indication.

According to further particular characteristics, said second entity further possesses means for, if said indication does not contain an additional instruction:
performing a DNS interrogation; and
on receiving the response from the interrogated DNS server, updating its copy of said DNS information on the basis of the content of said response.

The advantages provided by these devices are essentially the same as those provided by the corresponding methods briefly summarized above.

It should be observed that it is possible to make these devices in the context of software instructions and/or in the context of electronic circuits.

The invention also provides a computer program downloadable from a communications network and/or stored on a computer-readable medium and/or executable by a microprocessor. This computer program is remarkable in that it includes instructions for executing steps of a method as briefly summarized above for dynamically updating DNS information, on being executed by a computer.

The advantages made available by this computer program are essentially the same as those made available by said method.

BRIEF DESCRIPTION OF THE DRAWINGS

Other aspects and advantages of the invention appear on reading the following detailed description of particular implementations given as non-limiting examples. The description refers to the accompanying figures, in which.

DETAILED DESCRIPTION OF ILLUSTRATIVE EMBODIMENTS

Although the present invention relates to IP networks in general, reference is given below by way of example to a network architecture of the IMS type, as summarized briefly above. This architecture is shown in FIG. 1.

The multimedia services made available by the IMS network 1 may comprise the following services: telephone; videophone, content sharing; presence; instant messaging; and television. These services are made available to a user of user equipment (UE) 10 belonging to the network 1, enabling the user equipment 10 to exchange multimedia streams and session control signals in compliance with the SIP protocol, e.g. with the user equipment of a user belonging to an SIP network (not shown) connected to the network 1.

The user equipment 10 may be a fixed or mobile terminal, or a residential or a business gateway, having SIP signaling means and possibly including audiovisual content playback means.

Figure 1:
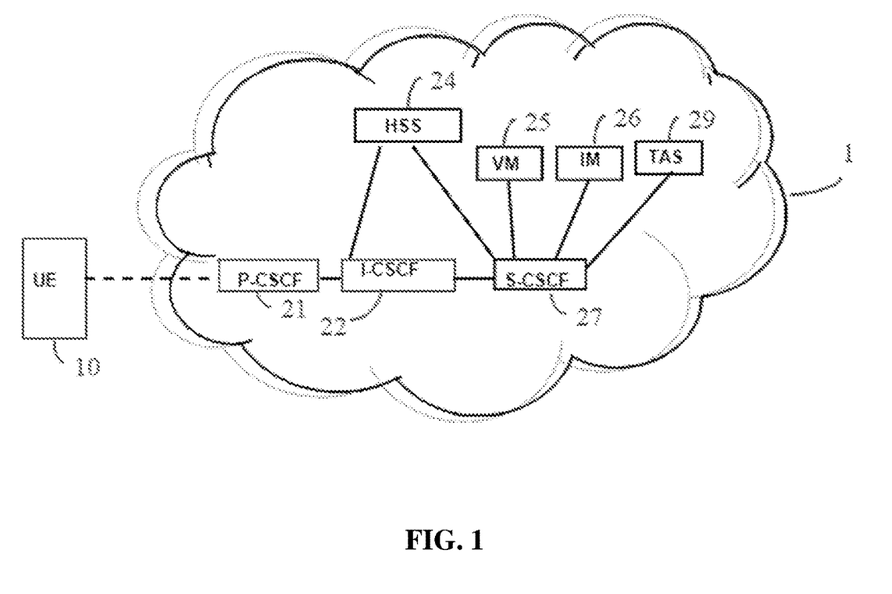
FIG. 1 is a diagram of a system for providing multimedia services and suitable for performing the invention.

As shown in FIG. 1, in addition to IP transport infrastructure (not shown) the IMS network 1 comprises:

at least one S-CSCF server; the S-CSCF server 27 manages in particular the procedure for registering devices connected to the network 1; the S-CSCF server 27 also manages the routing of signaling between the user equipment 10 and the voice messaging (VM) servers 25, instant messaging (IM) servers 26, and telephony application servers (TAS) 29;

at least one I-CSCF server; the I-CSCF server 22 manages in particular routing to other terminals managed by the same IMS network 1 and routing signaling between this IMS network 1 and other networks (not shown);

one or more proxy-call server control function (P-CSCF) servers; the P-CSCF server 21 serves as a connection entity between the IMS core network and the access network used by the user equipment 10; thus, all of the SIP signaling exchanged between the user equipment 10 and the I/S-CSCF call server 22 passes via the P-CSCF server 21;

one or more HSS type database servers; an HSS server 24 contains the profile of the user of the user equipment 10 in terms of authentication data, location data, and subscribed services;

one or more voice messaging (VM) servers 25 for providing message summaries; a VM server 25 manages the subscription of the user equipment 10 to events concerning leaving and/or consulting messages for the user equipment 10, and it notifies the user equipment 10 when such events occur;

one or more presence servers (PS) 26; a PS server 26 receives, stores, and distributes information concerning the presence of the user of the user equipment 10 on the network; and one or more telephony application servers (TAS) 29; a TAS server manages the telephone services to which the user of the terminal 10 has subscribed with the operator, such as presenting numbers or call forwarding.

The voice messaging, presence, and telephony servers VM 25, PS 26, and TAS 29 are examples of application servers (AS).

Certain services, in particular those of the VM server 25 and of the PS server 26, rely on the terminal 10 subscribing to predetermined events.

There follows a description of various implementations of the method of the invention for dynamically updating DNS information.

It should be observed that numerous variants are possible concerning the format of the messages sent by the first entity in compliance with the invention. As a first example, the description below makes use of a new SIP protocol header, referred to as "Flush-DNS".

Figure 2:
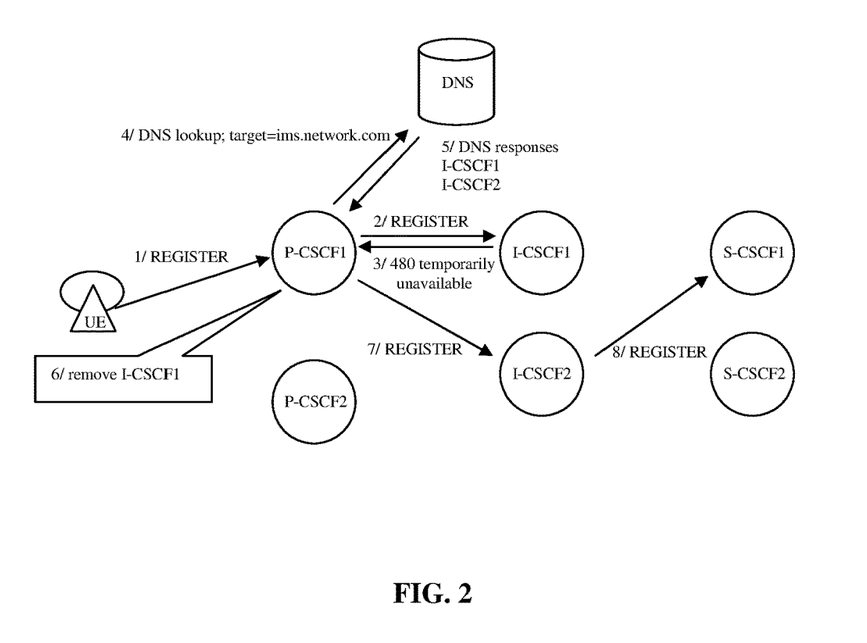
FIG. 2 shows a mechanism for dynamically updating DNS information associated with redirecting a REGISTER request, in a first implementation of the invention.

FIG. 2 shows the steps of a first implementation of the invention in which it is a P-CSCF server that dynamically updates its DNS information.

It is assumed, in conventional manner, that a server P-CSCF1 has interrogated a DNS server at a certain moment and that the header of the interrogation request indicated as its target ("target=ims.network.com") the IMS network for which this server P-CSCF1 is an entry point. It is also assumed that the DNS server responded by providing the address of two I-CSCF servers, namely the servers I-CSCF1 and I-CSCF2, while specifying higher priority for the server I-CSCF1 over the server I-CSCF2.

During a step E1, a server P-CSCF1 forwards a registration request REGISTER to the server I-CSCF1, as previously received by said server P-CSCF1 from a user equipment UE.

During a step E2, e.g. after detecting the loss of the transmission link between the server I-CSCF1 and the server S-CSCF1 in charge of the UE in question, or as a result of a maintenance operation being performed on the link, the server I-CSCF1 sends a temporary non-availability message to the server P-CSCF1, which message includes the following header:
Flush-DNS: date=now; target=ims.network.com; remove=I-CSCF1.ims.network.com; ttl=1200

During a step E3, the server P-CSCF1 reads said message and in particular the Flush-DNS header.

This Flush-DNS header informs the server P-CSCF1 that it is necessary immediately ("date=now") to perform a new DNS interrogation for the target "ims.network.com" ("target=ims.network.com"); furthermore, this Flush-DNS header also gives the instruction that the DNS record relating to the server I-CSCF1 should then be removed ("remove=I-CSCF1.ims.network.com") for a duration of 1200 seconds ("ttl=1200").

During a step E4, in compliance with the received Flush-DNS header, the server P-CSCF1 re-interrogates the DNS server, once more specifying the IMS network as the target ("target=ims.network.com").

During a step E5, the DNS server responds as before specifying the addresses of the servers I-CSCF1 and I-CSCF2.

During a step E6, in compliance with the received Flush-DNS header, the server P-CSCF1 removes its record relating to the server I-CSCF1 for a duration of 1200 seconds.

During a step E7, the server P-CSCF1 thus transmits the registration request to the server I-CSCF2.

Finally, during a step E8, the server I-CSCF2 transmits the registration request to the server S-CSCF1 in charge of the UE in question.

In a variant of this implementation, which is useful in the event of the server I-CSCF1 being overloaded (e.g. for an expected duration of 1200 seconds), the Flush-DNS header sent by the server I-CSCF1 conveys an instruction (using the parameter "priority" or "weight") to modify the priority that is associated therewith in the DNS server (possibly after the DNS server has been interrogated by the server I-CSCF1). The content of the Flush-DNS header could then read as follows:
Flush-DNS: date=now; target=ims.network.com; modify=I-CSCF1.ims.network.com; priority=50; ttl=1200
or indeed as follows:
Flush-DNS: date=now; target=ims.network.com; modify=sip_udp_I-CSCF1.ims.network.com; weight=25; ttl=1200

Thus, in this variant, the server P-CSCF1 interrogates the DNS server and then modifies priorities compared with those given in the DNS response. Thereafter, in compliance with the Flush-DNS header, the server P-CSCF1 selects the server I-CSCF2 over the duration in question since its priority is temporarily higher than that of the server I-CSCF1.

Figure 3:
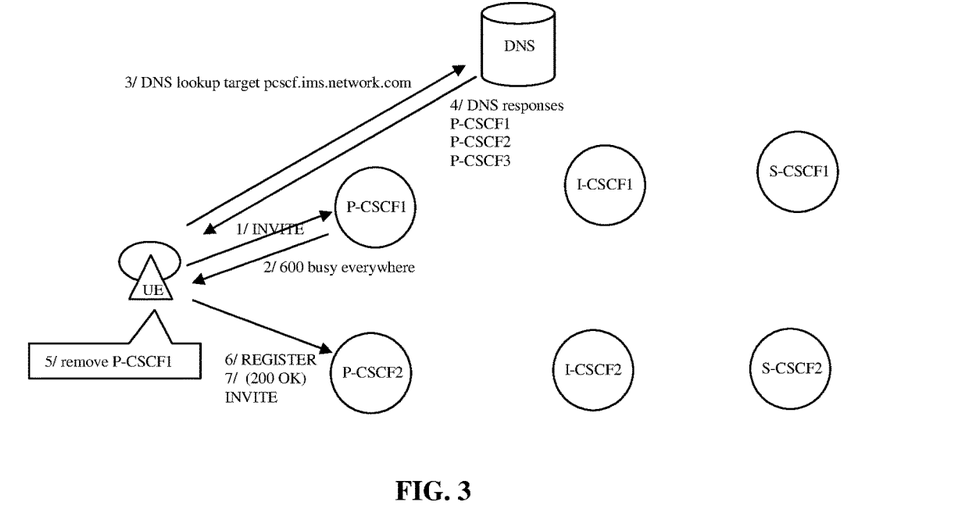
FIG. 3 shows a mechanism for dynamically updating DNS information associated with a change of P-CSCF on an INVITE request, in a second implementation of the invention.

FIG. 3 shows the steps of a second implementation of the invention, in which it is a user equipment UE that dynamically updates its DNS information.

This implementation relates for example to a reallocation of P-CSCF (e.g. as a result of overloading or of a new P-CSCF type node being added). This reallocation may be implemented as a result of a P-CSCF receiving any type of SIP request, e.g. a communication request of the INVITE type.

During a step F1, the user equipment UE sends an INVITE request to a server P-CSCF1.

During a step F2, the server P-CSCF1, observing that it is overloaded, sends a message to this effect to the user equipment UE ("busy everywhere"), e.g. including the following header:
Flush-DNS: date=now; target=ims.network.com; remove=P-CSCF1.ims.network.com; ttl=7200, or the following header:
Flush-DNS: date=now; target=ims.network.com; remove=98.76.54.32; ttl=7200,
where "98.76.54.32" is the IP address of the server P-CSCF1.

During a step F3, the user equipment UE reads said message and in particular the Flush-DNS header.

This Flush-DNS header informs the user equipment UE that it is necessary immediately ("date=now") to perform a new DNS interrogation for the target "ims.network.com" ("target=ims.network.com"); furthermore, this Flush-DNS header gives the instruction that the DNS record relating to the server P-CSCF1 should then be removed for a duration of 7200 seconds.

During a step F4, in compliance with the received Flush-DNS header, the user equipment UE re-interrogates the DNS server specifying the P-CSCF servers as targets ("target=p-cscf.ims.network.com").

During a step F5, the DNS server responds by giving the addresses of the servers P-CSCF1, P-CSCF2, and P-CSCF3.

During a step F6, in compliance with the received Flush-DNS header, the user equipment UE removes its record relating to the server P-CSCF1 for a duration of 7200 seconds.

During a step F7, the user equipment UE thus sends a registration request REGISTER to the server P-CSCF2.

Finally, during a step F8, after receiving acknowledgment of receipt ("200 OK"), the user equipment UE sends an INVITE request to the server P-CSCF2.

In a variant of this implementation, the P-CSCF reallocation is performed after receiving a REGISTER type registration request. By way of example, in a "200 OK" response to the REGISTER request, the server P-CSCF1 uses the Flush-DNS header to indicate a duration (date= . . . ) updated with a value longer than that of the registration period. Consequently, it is only after its next registration that the user equipment UE will perform a DNS interrogation and then apply the instructions contained in the Flush-DNS header. This variant makes it possible advantageously to reorganize the network without giving rise to an avalanche of registrations.

Furthermore, the present invention proposes a novel subscription event dedicated to DNS configuration changes and it associates an SIP supervision agent with this subscription event; this supervision agent is preferably implanted directly in the DNS server. This supervision agent is in charge of processing subscription requests sent by network entities to events relating to certain changes of DNS configuration. The subscription request may include information about the IP domain or the DNS target for which the subscriber seeks to receive a notification.

The supervision agent is also in charge of sending notifications of these DNS configuration changes to subscribers. They can then either re-interrogate the DNS server, or merely extract the information for updating the DNS records concerned from the content of the body of the notification message (body xml).

Figure 4:
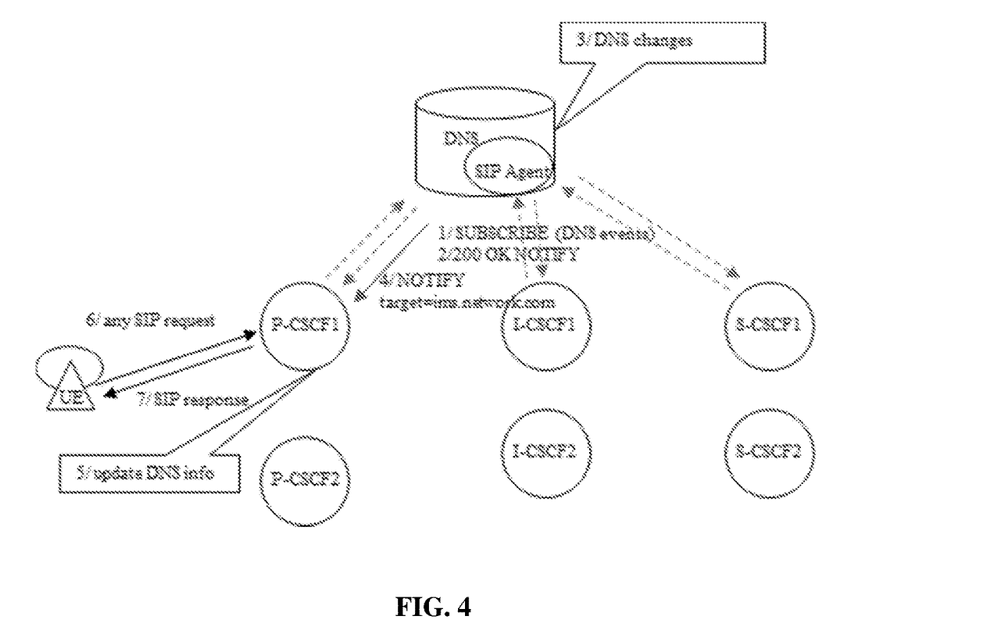
FIG. 4 shows a mechanism for dynamically updating DNS information associated with a subscription dedicated to DNS configuration changes, in a third implementation of the invention.

FIG. 4 shows the steps of a third implementation of the invention, in which use is made of the subscription of the invention.

During a step S1, a server P-CSCF1, a server I-CSCF1, and a server S-CSCF1 subscribe to DNS events (using SUBSCRIBE requests).

During a step S2, the DNS supervision agent responds to each of these servers with a "200 OK" message followed by a "NOTIFY" message in order to terminate the procedure of setting up the subscription. These steps S1 and S2 are represented by dashed-line arrows in FIG. 4.

Subsequently, during a step S3, the network operator modifies some of the data recorded in the DNS server.

During a step S4, the SIP supervision agent hosted in the DNS server is informed of the modification and sends a notification to those nodes that have subscribed to the event for this target (target=ims.network.com).

Finally, during a step S5, the server P-CSCF1 updates its DNS information. As mentioned above, and by way of example, the server P-CSCF1 may do this by re-interrogating the DNS server, or by extracting the corresponding information from the body (body xml) of the NOTIFY message.

Subsequently, during a step G1, a user equipment UE sends an SIP request (REGISTER, INVITE, or other, depending on the needs of the user equipment UE) to the server P-CSCF1.

During a step G2, the server P-CSCF1 then responds to the user equipment UE with a message including the following header:
Flush-DNS: date=now; target=ims.network.com.

During a step G3, the user equipment UE reads said message and in particular the Flush-DNS header, and observes that it does not contain any additional instruction in accordance with the invention.

This Flush-DNS header informs the user equipment UE that it must immediately (date=now) re-interrogate the DNS server during a step G4, and after receiving the response from the DNS server during a step G5, it must act during a step G6 to update its DNS information before sending the next registration request.

In a fourth implementation of the invention (not shown in the drawings), P-CSCF reallocation is performed subscriber by subscriber (e.g. as a result of a maintenance situation on a P-CSCF type node). This reallocation may be performed as a result of a P-CSCF receiving any type of SIP request, e.g. an INVITE type communication request.

During a step H1, the user equipment UE sends an INVITE request to a server P-CSCF1.

During a step H2, the server P-CSCF1 for which a maintenance operation is programmed, sends a message to this effect ("busy everywhere") to the user equipment UE, the message including the following header, for example:
Flush-DNS: do-not-check; date=now; target=ims.network.com
remove=98.76.54.32; ttl=36000
where "98.76.54.32" is the IP address of the server P-CSCF1.

During a step H3, the user equipment UE reads said message and in particular the Flush-DNS header.

This Flush-DNS header informs the user equipment UE that is must immediately (date=now) delete its local copy of the record corresponding to the address of the server P-CSCF1, and it must do this without performing a DNS interrogation (do-not-check). Since the maintenance operation is planned to last 10 hours, the ttl is given a value of 36000 seconds.

During a step H4, in compliance with the received Flush-DNS header, the user equipment UE removes its record relating to the server P-CSCF1 for a duration of 36000 seconds.

During a step H5, the user equipment UE thus sends a registration request REGISTER to the server P-CSCF2.

Finally, during a step H6, after receiving the acknowledgment of receipt ("200 OK"), the user equipment UE sends an INVITE request to the server P-CSCF2.

Depending on requirements, the person skilled in the art knows how to define other instructions in addition to those described in the above-described implementation. For example, the first entity may make use of an additional instruction "add= . . . " to request the second entity to add a DNS record.

In the above description of implementations of the invention, the messages sent by a first entity in compliance with the invention make use of the new "Flush-DNS" header. However other formats are naturally possible for these messages.

Thus, in a variant, the indication of the invention of the need to modify a copy of DNS information may be conveyed in a message body (body xml) of a new type, referred to as "application/flushDNS". A specific xml delimiter then serves to separate from the rest each of any additional instructions of the invention.

In yet another variant, the indication of the invention of the need to modify a copy of DNS information may be conveyed as a parameter in the "Via" header. This variant is nevertheless possible only in the context of a message for the adjacent node, which can determine additional instructions, if any, by inspecting the content of the first level Via header ("topmost").

In general manner, the present invention may be performed within nodes of an IP network, e.g. IMS core network servers or user equipments, by using software and/or hardware components.

The software components may be incorporated in a conventional computer program for managing a network node. That is why, as mentioned above, the present invention also provides a computer system. The computer system comprises in conventional manner a central processor unit using signals to control a memory, and an input unit and an output unit. Furthermore, the computer system may be used to execute a computer program including instructions for performing any one of the methods of the invention for dynamically updating DNS information.

Specifically, the invention also provides a computer program downloadable from a communications network and including instructions for executing steps of a method of the invention for dynamically updating DNS information when executed on a computer. The computer program may be stored on a computer-readable medium and may be executable by a microprocessor.

The program may use any programming language and be in the form of source code, object code, or code intermediate between source code and object code, such as in a partially compiled form, or in any other desirable form.

The invention also provides a non-removable or a partially or totally removable data medium that is readable by a computer and that includes instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or magnetic recording means such as a hard disk, or indeed a universal serial bus (USB) flash drive.

Furthermore, the data medium may be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the methods of the invention for dynamically updating DNS information.

Although the present disclosure has been described with reference to one or more examples, workers skilled in the art will recognize that changes may be made in form and detail without departing from the scope of the disclosure and/or the appended claims.

The invention claimed is:

1. A method of dynamically updating DNS information in an IP network, the method comprising the following acts:
   a first entity of said IP network, which is not a DNS server and is distinct from DNS servers of the IP network, receives a request from a second entity of the IP network, which is likewise not a DNS server and is distinct from the DNS servers of the IP network but possessing a copy of a DNS information constituting a record in at least one DNS server of the IP network;
   said first entity responds to said request by sending a message to said second entity, the message including an indication containing an instruction to modify said copy;
   on receiving said message sent by the first entity, the second entity reads the message to determine whether said indication contains at least one additional instruction; and
   operating the second entity as a function of whether said indication contains at least one additional instruction, wherein the second entity is configured to perform the following act when said indication contains at least one additional instruction:
      performing a DNS interrogation, and on receiving a response from an interrogated DNS server, modifying the copy of said DNS information on the basis of content of said response and of said additional instruction; or
      modifying the copy of said DNS information on the basis of said additional instruction without performing a DNS interrogation.

2. A method according to claim 1 for dynamically updating DNS information, wherein said indication contained in the message sent by the first entity includes a waiting duration to be observed by the second entity before performing a DNS interrogation.

3. A method according to claim 1 for dynamically updating DNS information, wherein the act of operating the second entity further comprises, if said indication does not contain an additional instruction, the second entity:
   performing a DNS interrogation; and
   on receiving the response from the interrogated DNS server, updating the copy of said DNS information on the basis of the content of said response.

4. A method according to claim 1 for dynamically updating DNS information, wherein said first entity observes a need to modify said copy of DNS information in response to said first entity receiving a notification message sent by a supervision agent for notifying certain changes of configuration of a DNS server to entities of the IP network that have subscribed to receiving notification messages sent by the supervision agent for notifying certain changes of configuration of the DNS server.

5. A method according to claim 1 for dynamically updating DNS information, wherein said first entity is a core network server.

6. A method according to claim 1 for dynamically updating DNS information, wherein said second entity is a user equipment or a core network server.

7. A device of an IP network, which is not a DNS server and is distinct from DNS servers of said IP network and referred to as a "second" entity, wherein the second entity comprises:
   a processing unit; and
   a non-transitory computer-readable medium comprising instructions stored thereon, which when executed by the processing unit configure the second entity to perform the following acts:
      receiving from an entity of the IP network referred to as a "first" entity and that is not a DNS server and is distinct from the DNS servers of the IP network, in response to a request sent by said second entity to said first entity, a message including an indication containing an instruction to modify a copy of a DNS information constituting a record in at least one DNS server of the IP network;
      reading said message to determine whether said indication contains at least one additional instruction; and
      when the indication contains at least one additional instruction:
         performing a DNS interrogation, and on receiving a response from an interrogated DNS server, modifying the copy of said DNS information on the basis of content of said response and of said additional instruction; or
         modifying the copy of said DNS information on the basis of said additional instruction without performing a DNS interrogation.

8. The device according to claim 7, wherein the instructions further configure the second entity to perform a DNS interrogation after waiting for a duration mentioned in said indication.

9. The device according to claim 7, wherein the instructions further configure the second entity to perform the following acts:
   if said indication does not contain an additional instruction:
   performing a DNS interrogation; and
   on receiving the response from the interrogated DNS server, updating the copy of said DNS information on the basis of the content of said response.

10. The device of claim 7, wherein the device is implemented in a terminal.

11. The device of claim 7, wherein the device is implemented in an IP core network server.

12. A non-transitory computer-readable medium comprising a computer program stored thereon, which is executable by a processor of a "second" entity of an IP network, which is not a DNS server and is distinct from DNS servers of said IP network, wherein the computer program includes instructions for executing a method for dynamically updating DNS information, and wherein the instructions configure the second entity to perform acts of:

receiving from an entity of the IP network referred to as a "first" entity and that is not a DNS server and is distinct from the DNS servers of the IP network, in response to a request sent by said second entity to said first entity, a message including an indication containing an instruction to modify a copy of a DNS information constituting a record in at least one DNS server of the IP network;

reading said message to determine whether said indication contains at least one additional instruction; and when the indication contains at least one additional instruction:

performing a DNS interrogation, and on receiving a response from an interrogated DNS server, modifying the copy of said DNS information on the basis of content of said response and of said additional instruction; or modifying the copy of said DNS information on the basis of said additional instruction without performing a DNS interrogation.

13. A system of an IP network, the system comprising:

a first device referred to as a "first" entity, which is not a DNS server and is distinct from DNS servers of said IP network, and comprising:

a first processing unit; and a first non-transitory computer-readable medium comprising instructions stored thereon, which when executed by the first processing unit configure the first entity to perform the following acts:

observing, concerning an entity of the IP network referred to as a "second" entity and which sent a request to the first entity, a need for said second entity of the network to modify a copy of a DNS information constituting a record in at least one DNS server of the IP network;

sending, in response to said request, a message to said second entity of the network, the message including an indication about said need; and subscribing with a dedicated supervision agent to notification of certain configuration changes of a DNS server, and wherein said observing a need to modify said copy of DNS information comprises receiving a notification message sent by said supervision agent; and a second device of the IP network, which is not a DNS server and is distinct from DNS servers of said IP network and referred to as the "second" entity, wherein the second entity comprises:

a second processing unit; and a second non-transitory computer-readable medium comprising instructions stored thereon, which when executed by the second processing unit configure the second entity to perform the following acts:

receiving from the "first" entity, in response to the request sent by said second entity to said first entity, the message including the indication containing an instruction to modify the copy of the DNS information constituting the record in the at least one DNS server of the IP network;

reading said message to determine whether said indication contains at least one additional instruction; and when the indication contains at least one additional instruction:

performing a DNS interrogation, and on receiving a response from an interrogated DNS server, modifying the copy of said DNS information on the basis of content of said response and of said additional instruction; or modifying the copy of said DNS information on the basis of said additional instruction without performing a DNS interrogation.

* * * * *